United States Patent [19]

Shoutaro et al.

[11] Patent Number: 4,700,223
[45] Date of Patent: Oct. 13, 1987

[54] VEHICLE FOR EVALUATING PROPERTIES OF ROAD SURFACES

[75] Inventors: Kato Shoutaro; Nakane Tatsuhide; Ogiwara Tetsuo, all of Tokyo, Japan

[73] Assignee: Kokusai Kogyo Co., Ltd., Tokyo, Japan

[21] Appl. No.: 832,126

[22] Filed: Feb. 24, 1986

[30] Foreign Application Priority Data

Jun. 7, 1985 [JP] Japan ............................... 60-122653

[51] Int. Cl.⁴ .............................................. H04N 7/18
[52] U.S. Cl. ......................................... 358/93; 256/4; 256/376; 358/103; 358/97; 358/903; 358/108
[58] Field of Search ................. 358/93, 103, 106, 107, 358/113, 108, 96, 229, 903, 97, 102; 356/3, 4, 8, 11, 376

[56] References Cited

U.S. PATENT DOCUMENTS

| | | | |
|---|---|---|---|
| 2,216,193 | 4/1955 | Riolo | 358/113 X |
| 3,882,268 | 5/1975 | Ogawa et al. | 358/108 X |
| 4,247,820 | 1/1981 | Gabel et al. | 358/93 |
| 4,278,142 | 2/1981 | Kono | 358/103 X |
| 4,555,725 | 11/1985 | Geiersbach et al. | 388/108 X |

FOREIGN PATENT DOCUMENTS

| | | |
|---|---|---|
| 50-33851 | 4/1975 | Japan . |
| 51-18564 | 2/1976 | Japan . |
| 53-10456 | 1/1978 | Japan . |
| 57-80510 | 5/1982 | Japan . |

*Primary Examiner*—James J. Groody
*Assistant Examiner*—Victor R. Kostak
*Attorney, Agent, or Firm*—Schwartz, Jeffery, Schwaab, Mack, Blumenthal & Evans

[57] ABSTRACT

The invention provides a vehicle for evaluating the properties of road surfaces wherein a road surface cross-section profile evaluating means, a crack-evaluating means, and a road surface longitudinal profile evaluating means are mounted on a predetermined vehicle. The measuring intervals of the respective means can be controlled in accordance with a signal from a single speedometer/range finder. Three kinds of road surface property values which are matched with each other can be obtained. Even if the evaluation system (evaluation vehicle) and the object system (road surface) have a relative speed, the road surface property values can be accurately determined irrespective of the relative speed. Therefore, accurate and reliable evaluation data can be obtained, and the vehicle can cope with high speed and heavy traffic.

3 Claims, 11 Drawing Figures

VEHICLE FOR EVALUATING PROPERTIES OF ROAD SURFACES

BACKGROUND OF THE INVENTION

1. Field of the Invention

The present invention relates to a vehicle mounting various evaluating apparatuses for evaluating the properties of road surfaces and an apparatus for processing evaluation data obtained by the evaluating apparatuses and, more particularly, to a vehicle for evaluating the properties of road surfaces which can automatically evaluate cracks, ruts (three-dimensional patterns formed in the road surfaces by wheels of automobiles), other road surface cross-section profiles, and longitudinal section profiles with reference to altitude upon one-time travel of the vehicle over an object road surface.

2. Description of the Prior Art

Vehicles mounting apparatuses for automatically evaluating cracks, ruts, and other road surface cross-section profiles of road surfaces have been known. These conventional evaluating vehicles measure from vehicles travelling on stationary roads. Therefore, accuracy and reliability of evaluation data may be poor. As for longitudinal section profiles, various techniques for automatically evaluating relative three-dimensional patterns have been proposed. However, means capable of automatic evaluation of longitudinal section profiles with reference to altitude has not been available, and in practice, such evaluation has been performed manually. A technique for reliably and accurately evaluating cracks, ruts, road surface cross-section profiles, and road surface longitudinal section profiles upon one-time travel on a given road surface has not been available. These problems will be discussed in more detail below:

(A) Problem Encountered in Means for Automatically Evaluating Ruts and the Like As a road surface cross-section profile evaluating means for evaluating ruts and the like on road surfaces, a technique as disclosed in Japanese Patent Publication No. 57-80510 (to be referred to as a first conventional technique hereinafter) has been known. In this technique, a vehicle has mounted thereon a projector for projecting a fan beam onto a road surface and a camera apparatus for image sensing a belt-like or elongated slit spot produced thereby on the road surface. The slit spot is continuously and instantaneously detected through a shutter mechanism having an exposure time corresponding to the vehicle speed by a light shielding method.

Recently, a road surface shape evaluation vehicle has also been proposed in Japanese Patent Disclosure No. 57-80510 (to be referred to as a second conventional technique hereinafter). According to the second conventional technique, a laser beam is radiated from a laser unit mounted on the vehicle at a predetermined angle with respect to the road surface in its widthwise direction. Light reflected by the road surface is received by a light-receiving unit to obtain a video signal representing the road surface shape. A processor of a video signal processing unit calculates a deviation of the cross-section profile with reference to a reference position based on the obtained video signal. A road surface three-dimensional pattern is calculated from the deviation and is stored in a memory. The data is read out from the memory as needed and is displayed as a cross-section profile on a monitor. Desired data is stored on a magnetic tape.

In the first conventional technique, a slit spot on a road surface is exposed for only a very short period of time utilizing a shutter mechanism or the like assembled in the camera apparatus. Therefore, the road surface which is moving relative to the evaluation system mounted on the vehicle is taken as a pseudo still image. The three-dimensional pattern profile at a given cross-section of the road surface is continuously extracted. For this reason, when the relative speed between the evaluation system (travelling vehicle) and the object system (road surface) is increased, as on highways, the exposure time must be reduced in inverse proportion to the relative speed. As a result, the exposure given by the product of the luminance and the exposure time is reduced, and sensing of the slit spot on the road surface becomes difficult.

For example, when the road surface travel distance, providing a negligible sensing error, is assumed to be 10 cm, when the relative speed between the evaluation system and the object system is 10 m/sec (about 40 km/hour), the upper limit of the exposure time, providing a negligible sensing error, is 1/100 sec. Therefore, in order to allow the evaluation vehicle to travel at a speed of 80 km/hour, the exposure time must be reduced to about 1/200 sec. However, in order to provide a sufficient amount of received light within such a short exposure time and to provide a maximum evaluation travel speed and a maximum number of measuring lines per unit distance, the intensity of the light source must be increased in inverse proportion to the exposure time. This is, however, impossible due to limitations in the capacities of the generators and projectors which can be mounted on such an evaluation system. Therefore, the cross-section profile of a road surface must be performed at a low speed of 20 km/hour with the first conventional technique, thus interfering with the smooth flow of traffic and limiting the practicable range of the evaluation vehicle.

In addition, according to the first conventional technique, even if evaluation can be performed at such a low speed, it is technically difficult to automatically keep the intensity of the light source and the exposure time constant in respect to the increase/decrease in the relative speed between the evaluation system and the object system.

In the second conventional technique, in order to solve the problem with the first conventional technique, a laser beam from a laser unit is radiated onto a road surface. The laser beam reflected from the road surface is continuously received by a light-receiving unit such as a TV camera. A video signal from the light-receiving unit representing the properties of the road surface is digitized, and the digital signal is stored in a digital memory. The digital video signal is calculated at each predetermined travel distance of the vehicle, and the deviation of a cross-section profile from a reference line is stored in a data memory.

In the second conventional technique, since the video signal representing the properties of a road surface is continuously stored in a digital memory and data sampling is performed by a processor at every predetermined travel distance of the vehicle, the system can provide good evaluation results at high travelling speeds. However, since the video signal is continuously stored in the digital memory, the capacity of the digital memory must be considerably large and as a consequence, the overall system is rendered bulky.

In either the first or second conventional technique, sampling at each predetermined distance is performed by extraction of a profile for a single cross-section measuring line obtained by exposure of the slit spot on the road surface. Therefore, neither technique can provide satisfactory accuracy and reliability in evaluation.

In the measurement of the cross-section profile of a road surface, a cross-section profile representative of adjacent cross-sections must be extracted. However, the cross-section profile extracted by either conventional technique is merely a local and individual sample among the many profiles which can be extracted adjacent to a given cross section.

In view of the above, when the measuring line includes local three-dimensional patterns such as pot holes or concrete joints, a cross-section profile including such local three-dimensional patterns may be extracted as evaluation data, and a truly representative cross-section profile may not be obtained.

Even in automatic evaluation of the properties of road surfaces as described above, time and labor required for such evaluation is considerable. When the amount of evaluation data including such local three-dimensional patterns as described above is large, re-evaluation must be performed, frequently resulting in re-doing of evaluation and processing.

(B) Problem in Evaluation of Road Surface Longitudinal Section Profile

As a means for evaluating the road surface longitudinal section profile, various techniques have also been proposed as per Japanese Patent Disclosure Nos. 50-33851, 51-18564, and 53-10456. In these techniques, relative three-dimensional patterns or deviations from a reference road surface are automatically evaluated using a projector such as a laser oscillator and a light-receiving unit such as a video camera. When relative three-dimensional patterns are evaluated in this manner, no problem is encountered when the reference road surface is horizontal. However, when the measuring range is not horizontal, such as a steep mountain road or a slope, evaluation is performed including such three-dimensional patterns. Therefore, with such an evaluation method, the reference road surface must be measured after evaluation of the properties of the road surface, and the measurement values obtained corresponding to the properties of the road surface must be corrected in accordance with the measured reference road surface.

In summary, in the evaluation of road surface longitudinal section profiles, no technique is available for reliable and accurate evaluation of longitudinal section profiles, and evaluation has been performed manually.

A road surface longitudinal section profile with reference to altitude is performed in the following manner. As shown in FIG. 9, wheels 51 and 52 are mounted on a fixed shaft 50 with a distance of 3 m therebetween. A level meter 54 is mounted at a midpoint of the shaft 50, between the wheels 51 and 52, so as to extend in a direction perpendicular to the shaft 50. This whole assembly constitutes a 3 m profile meter. Using this profile meter, a longitudinal section three-dimensional pattern d with reference to a reference plane $H_0$ connecting the ground contact surfaces of the wheels 51 and 52, which is given by:

$$d = (h_{i-1} + h_{i+1})/2 - h_i \qquad (1)$$

is directly recorded by continuous evaluation in the road surface longitudinal section direction. A standard deviation is calculated from the three-dimensional pattern measured for each 1.5 m and the number n of data as an index which provides variations in the longitudinal section three-dimensional patterns. The properties of the road surface are evaluated in accordance with the standard deviation calculated in this manner. However, with this evaluation method, even if the overall road surface is flat, if there is a large local three-dimensional pattern, the standard deviation also is calculated to be large. When there are three-dimensional patterns with a large period, the standard deviation is calculated to be small. In either case, in a method wherein the longitudinal section three-dimensional pattern d is evaluated with reference to the reference plane $H_0$ connecting the ground contact surfaces of the wheels 51 and 52 and the measured value is evaluated with reference to a reference deviation, a reliable result may be obtained as to evaluation of properties of a limited area of a road surface. However, the particular position of a defect on the actual road surface cannot be determined by monitoring the continuous evaluation records of the longitudinal section three-dimensional patterns d. Therefore, visual observation must also be performed, and the method is not suitable for automatic evaluation.

In order to eliminate the problems with the conventional techniques, another method is available, as shown in FIG. 10. In this method, three measurement values of distances ha, hb, and hc from three points on a fixed shaft 50, separated from each other by about 2 m, to the road surface are obtained together with altitudes Ya and Yb at a measurement start point a and a first measuring point b. An altitude Yc at a second measuring point is calculated in accordance with the altitudes Ya and Yb at the two points and the measurement values of the distances ha, hb, and hc, in accordance with equation (2) below:

$$Yc = 2Yb - Ya - (ha - 2hb + hc) \qquad (2)$$

This evaluation method can theoretically provide the road surface altitude at each measuring point. However, it is impossible to obtain the altitudes of the measurement start point and the first measuring point, which are separated by about 2 m from a conventional measuring drawing. Therefore, standard measurement must be performed before evaluation of the longitudinal section profile. This method is also not suitable for automatic evaluation.

In this method, even if there is only a very small error in standard measurement, an accumulated error is large when road surface measurement is performed a large number of times. This accumulated error cannot be corrected, resulting in low accuracy.

A road surface to be measured is not always flat but frequently has slopes and therefore, the measuring pitch with reference to a reference horizontal line varies slightly. With the above method, then, it is impossible to determine a horizontal distance between measuring points. In any case, accurate measurement cannot be performed, and the method is not suitable for automatic evaluation.

(C) Overall Problem

The above-mentioned conventional techniques can individually evaluate cracks, ruts, and relative longitudinal three-dimensional patterns on road surfaces. However, no technique is available which can reliably and accurately evaluate the longitudinal section profile in place of the relative longitudinal section three-dimensional patterns with reference to altitude upon one-time travel of the vehicle on a road surface.

SUMMARY OF THE INVENTION

It is, therefore, a main object of the present invention to provide a vehicle for evaluating the properties of road surfaces, which resolves the problems with the conventional techniques, can cope with heavy and high-speed traffic on modern roads, can automatically and reliably evaluate cracks, ruts, and the longitudinal section profile of road surfaces upon one-time travel of the vehicle thereon, can control measurement of three different properties with a single speedometer/range finder, and can output matched evaluation data.

A vehicle according to the present invention comprises a cross-section profile evaluating means for evaluating ruts and other road properties and having the arrangement to be described below, a crack-evaluating means, and a longitudinal section profile-evaluating means for evaluation with reference to altitude, wherein the respective means can perform evaluation based on a signal from a single vehicle speedometer/range finder.

With the vehicle of the above arrangement, even if measurements by the respective means are individually performed, respective evaluation data can be matched, and subsequent analysis processing is facilitated. The present invention therefore provides, for the first time, a vehicle for accurately evaluating the overall properties of road surfaces.

Various members used for the respective evaluating means, e.g., a CCD camera, an optical level meter, a film camera, and the like are effectively arranged on front and rear portions of the evaluation vehicle and the vehicle base. Accordingly, the present invention provides a single vehicle which can evaluate three different kinds of properties of road surfaces upon one-time travel of that vehicle on a road surface.

In order to achieve the above object of the present invention, the road surface cross-section profile evaluating means has a CCD camera which is arranged at the rear or front portion of the vehicle and receives a reflected beam from the road surface irradiated with a fan laser beam. The CCD camera senses the reflected beam over a predetermined period of time based on a signal from the speedometer/range finder so as to form on its light-receiving surface a matrix discharge distribution exposed integrally in correspondence with the sensing time. The matrix charge distribution is scanned in the road surface longitudinal section direction so as to obtain a peak exposure for each scanning line, and the road surface cross-section profile is formed in accordance with the peak value.

According to the above-mentioned evaluating means, instead of obtaining a single road surface cross-section profile as in conventional techniques, a number of road surface cross-section profiles over a predetermined period of time or a predetermined distance are sensed by a CCD camera based on a signal from the speedometer/range finder. The road surface cross-section profiles are focused on the light-receiving surface of the CCD camera so as to overlap. In other words, the matrix charge distribution is exposed integrally in correspondence with the sensing time. The peak value of the exposure for each scanning line is obtained in accordance with the charge distribution. With this arrangement, even if the vehicle travels at a high speed of about 80 km/hour or even if a laser beam having a small output is used, reliable and accurate evaluation data can be obtained, and a compact laser oscillator can therefore be used.

When an optical filter of the same color as the laser beam is mounted on the light-receiving surface of the CCD camera, measurement interference caused by an external light source, such as an illumination source in a tunnel, can be eliminated.

In addition, the longitudinal section profile evaluating means comprises three optical level meters arranged at equal intervals on a vehicle frame parallel to the road surface, in series with each other with reference to the vehicle travel direction, and in correspondence with the measuring pitch ($l_0$), so that a set of three pieces of evaluation data can be simultaneously obtained at each measuring pitch ($l_0$). Therefore, even if there is a relative speed between the evaluation system (evaluation vehicle) and the object system (road system), the properties of the road surface can be reliably obtained irrespective of such relative speed. The evaluation system can cope with high- and variable-speed travel, resulting in no traffic interference or timing limitations.

Since a set of three pieces of evaluation data can be obtained for each measuring pitch ($l_0$), a road surface longitudinal section profile with reference to altitude can be evaluated, as will be described later, in place of evaluating the relative road surface longitudinal section three-dimensional shape. Therefore, upon one-time travel of the vehicle, the road surface longitudinal section profile can be reliably and accurately evaluated, without requiring evaluation of the reference road surface after actual measurement and complex correction calculation based on the evaluated reference road surface.

In addition, when the road surface radiation spot diameter of the optical level meters is set to be about 1 cm, i.e., a predetermined diameter larger than many pinholes in the road surface, factors which may result in evaluation errors of the longitudinal section profile due to pinholes can be eliminated.

According to the present invention, the triple-element optical level meters simultaneously measure distances to the road surface at three points corresponding to the measuring pitch ($l_0$) at each measuring pitch ($l_0$) based on a signal from the vehicle speedometer/range finder, and a temporary road surface level ($Y_i$) and a temporary horizontal distance ($X_i$) for each measuring point having as temporary coordinates a line connecting the measurement start point ($a_l$) and the first measuring point ($b_l$) are obtained based on evaluation data at the three points. The temporary coordinates are converted into standard coordinates from the temporary level ($Y_i$) and the temporary horizontal distance ($X_i$) and other known altitudes at any two given points among the respective measuring points, so as to obtain a road surface height ($H_i$) and a horizontal distance ($D_i$) at each measuring point. For this reason, various error factors which are included in the conventional techniques can be eliminated, and the longitudinal section profile obtained can be not a standard deviation profile but one corresponding to actual road surface shape.

In the crack-evaluating means, the film camera at the front or rear portion of the evaluation vehicle can sense in a direction perpendicular to the road surface. Therefore, when the projector is arranged at a predetermined angle with respect to the optical axis of the film camera, cracks on the road surface can be sensed clearly with the light shielding method. In addition, since the film is fed in accordance with the vehicle speed based on a signal from the speedometer/range finder, matching between the film and the various evaluation data can be achieved.

DETAILED DESCRIPTION OF THE PREFERRED EMBODIMENT

A preferred embodiment of the present invention will be described in detail with reference to the accompanying drawings. The sizes, materials, shapes, and arrangements of respective parts of the embodiment to be described are only descriptive examples and are not intended to restrict the scope of the present invention, unless otherwise stated.

Figure 1:
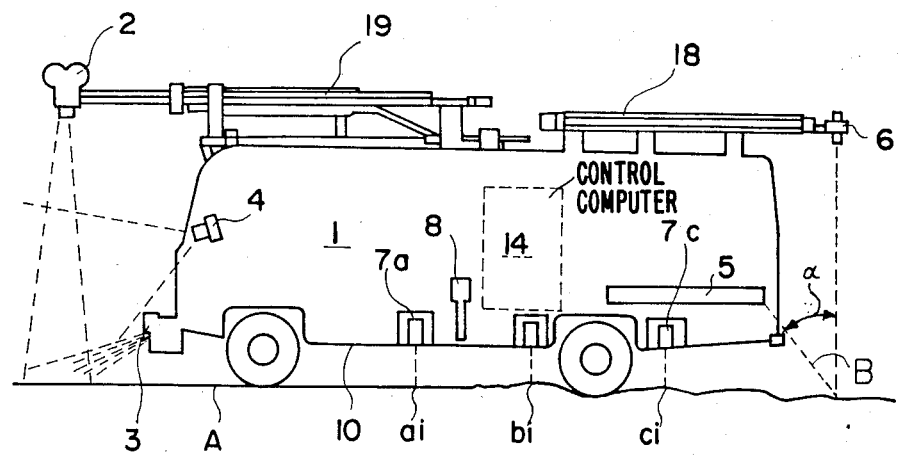
FIGS. 1 and 2 are, respectively, a front and a plan view showing the internal configuration of an evaluation vehicle according to an embodiment of the present invention.
Figure 2:
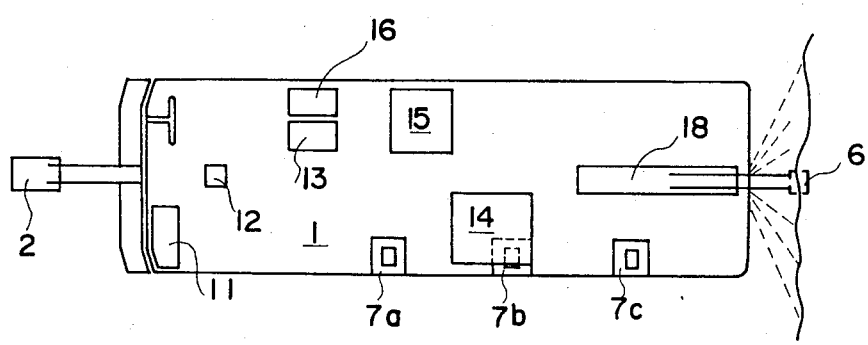

FIGS. 1 and 2 show arrangements of various apparatuses mounted on an evaluating system according to an embodiment of the present invention.

An evaluating vehicle 1 has a travel speed of at least 80 km/hour and adopts an individual suspension system to allow shock absorption. As shown in FIG. 1, a slit camera 2, a halogen lamp array 3, and a TV camera 4 for recording road shoulder information, which are all used for evaluating cracks, are mounted at the front portion of the vehicle 1. A laser oscillator 5 and a CCD camera 6 used for evaluating ruts are mounted at the rear portion of the vehicle 1. Optical triple-element level meters 7a, 7b, and 7c, and a travel speedometer/range finder 8 for evaluating the longitudinal section profile, are mounted below and at the side of a base 10 of the vehicle 1.

As shown in FIG. 2, a remote controller 11, for remote control of the various evaluating units; a CRT 12 for monitoring the road shoulder information, the road surface cross-section profile evaluating state, and the like; a VTR unit 13, for recording images of the road shoulder information; a control computer 14, for controlling evaluation of the evaluating units and processing output information therefrom; a magnetic recording unit 15, for recording an output signal from the computer 14; and the like are mounted inside the vehicle 1. Thus, respective data, i.e., the crack evaluation, road shoulder information recording, road cross-section profile evaluation, and longitudinal section profiles can be obtained with excellent matching properties based on a signal from the speedometer/range finder 8.

The construction and evaluation method of each unit will be described in detail below.

(A) Construction, Evaluation Method, and Processing of Road Surface Cross-Section Profile Evaluation The laser oscillator 5 comprises an He.Ne laser having a rated output of 50 mW. As shown in FIG. 1, the oscillator 5 is arranged such that it can radiate a fan beam B toward a road surface A at a predetermined angle (90-$\alpha$) with reference to the road surface A, so as to intersect it in the widthwise direction from the rear portion of the vehicle 1, travelling at a given speed thereon.

The CCD camera 6 used has, for example, 490V×384H pixels. The camera 6 is mounted on a member 18 extendable along the travel direction of the vehicle 1 and fixed at the rear portion of the top of the vehicle 1, such that its optical axis intersects perpendicularly the road surface A.

As a result, the fan beam of the laser oscillator 5 and the optical axis of the camera 6 intersect at an angle $\alpha$ on the road surface A. Therefore, a slit spot appearing on the road surface A upon irradiation thereof by the laser oscillator 5, can be sensed with the light shielding method. Since the light is received in a direction perpendicular to the road surface, correction of the evaluation data is easy.

When an optical filter of the same color as the laser light source is mounted on the light-receiving surface of the CCD camera 6, evaluation interference caused by neon signs, street lamps, internal illumination in a tunnel, and other light sources can be prevented.

Figure 3:
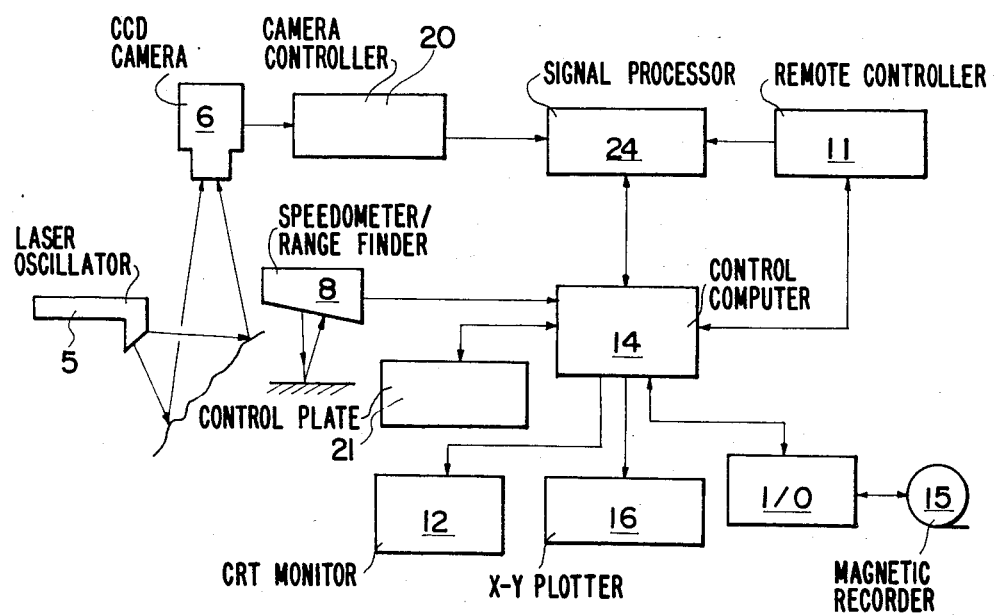
FIG. 3 shows a flow of an evaluation/processing process for ruts.

FIG. 3 shows a system for evaluating the road surface cross-section profile, which consists of the laser oscillator 5, the CCD camera 6, and a control system to be described later. The evaluation/processing process will be described in sequential order below.

The CCD camera 6 senses a slit spot on the road surface A formed thereon by irradiation with a laser beam. The camera 6 outputs a charge signal (density information) for each pixel G of a pixel matrix consisting of 490V×384H pixels of the screen. The charge signal is transferred upon vehicle travel over a predetermined distance (5 m minimum to 20 m maximum) by the shutter mechanism, which is actuated in synchronism with the speedometer/range finder 8. The transferred signal is processed by a signal processor 24 with a searching means, to be described later, to find an optimal cross-section profile N. The profile is converted into a digital signal by the control computer 14 and the thus obtained signals are sequentially stored in the magnetic recording unit 15. Reference numeral 21 denotes a control plate for operating the control computer 14; and 20, a control section for the CCD camera 6.

The recorded data includes a digital signal from the speedometer/range finder 8 representing a point of travel. Therefore, the data can be off-line processed at any time after evaluation, so as to provide a cross-section profile of a designated point on a CRT printer, an X-Y plotter 16, or the like.

The method of searching the cross-section profile processed by the signal processor will be described below. First, when an object moving at a given speed is sensed, information obtained by the camera 6 is not a slit spot image $h_i$ of a single measuring line, but an integration of sequential slit spots $h_i$ in a predetermined travel range, subjected to sensing within the exposure time. Therefore, a charge signal is obtained by superposition of all the slit spot images $h_i$ appearing within the sensing interval.

Figure 4:
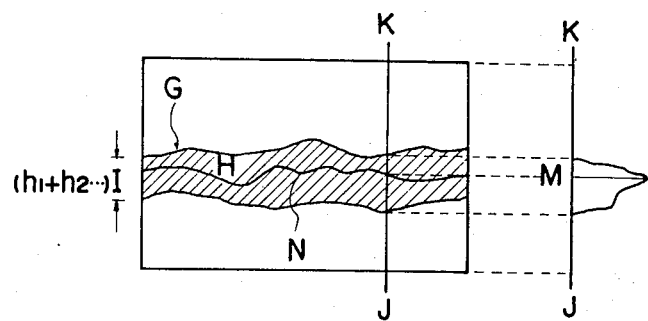
FIG. 4 is an explanatory diagram therefor.
Figure 10:
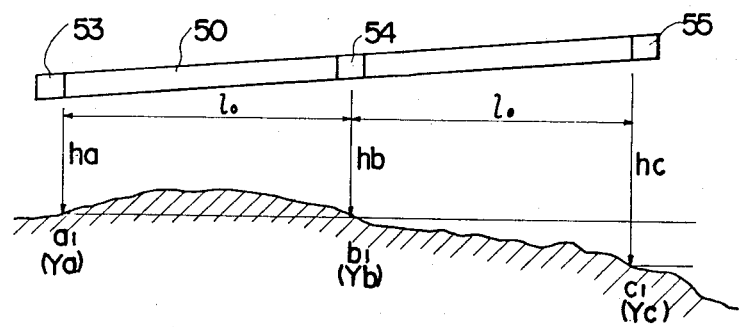
FIGS. 9 and 10 are diagrams for explaining different conventional road surface longitudinal section profiles, respectively.

If the cross-section profile N does not change in the extending direction of the road surface A, the images G are focused into a single thin line. However, in general, since road surfaces have pot holes and other irregular three-dimensional patterns, a curve H having a certain width I, as shown in FIG. 4, which reflects the cross-section profile N within a sensing range is obtained. When the curve H is cut at a given position J-K along the direction of the three-dimensional pattern, the exposure distribution of the curve H within the width I can be determined.

When the image G having the predetermined width I is cut at small intervals along the road surface longitudinal section direction and the point M at the maximum exposure is searched for each cut plane, a set of detected points are extracted as a cross-section profile N representing the measuring point.

Since the above-mentioned searching means is known, a detailed description thereof will be omitted. However, when the charge signal is stored in an internal memory and is scanned by the signal processor in the direction of the three-dimensional pattern by a known method, the maximum exposure point M can be easily detected.

Figure 5:
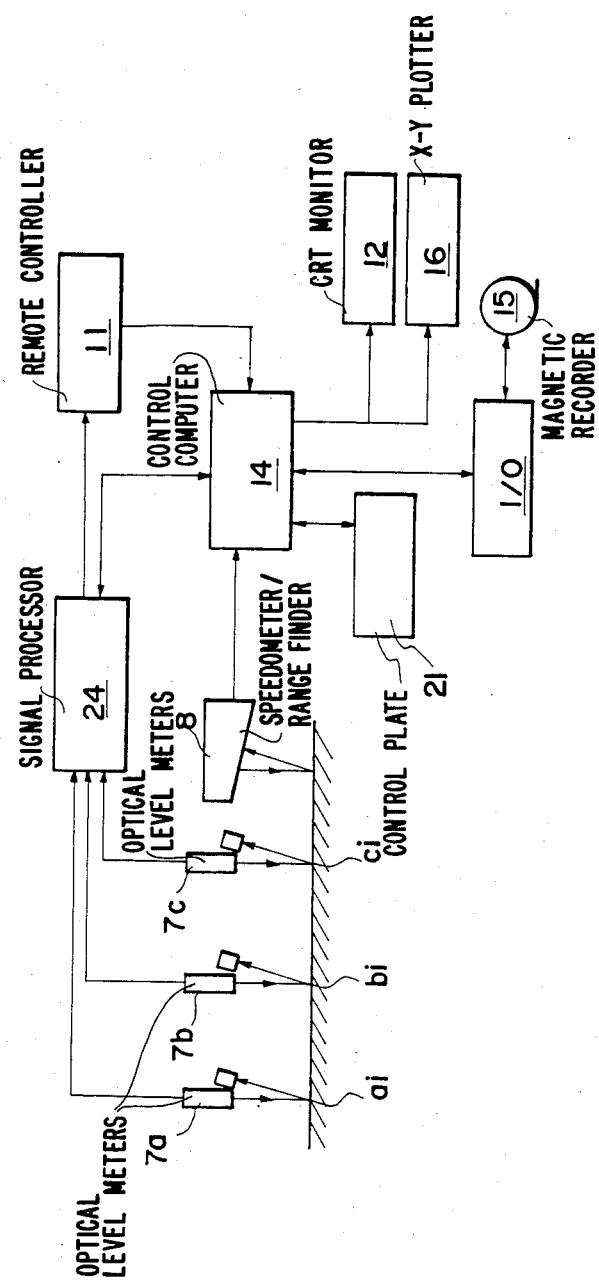
FIGS. 5, 6a, and 6b are flow charts and an explanatory diagram of an evaluation/processing process for a longitudinal section profile.

(B) Construction, Evaluation, and Processing of Road Surface Longitudinal Section Profile As shown in FIG. 5, optical triple-element level meters 7a, 7b, and 7c are arranged on the vehicle base 10 holding the axle so as to be close to the axle. The meters 7a, 7b, and 7c are arranged at intervals of 1.5 m corresponding to the measuring pitch ($l_0$), at a distance of 30 cm from the road surface, and such that they are directed perpendicularly thereto (FIG. 1).

The optical triple-element level meters 7a, 7b, and 7c perform simultaneous three-point measurement of a distance between the vehicle base 10 and the road surface at predetermined time intervals in correspondence with the travel speedometer/range finder 8. Evaluation data ($A_i B_i C_i$) from the meters 7a, 7b, and 7c is supplied to the magnetic recording unit 15 through the signal processor 24 and the control computer 14.

The evaluation data ($A_i B_i C_i$) supplied to the magnetic recording unit 15 must not include an evaluation error due to pinholes or the like on the road surface. For this purpose, the meters 7a, 7b, and 7c are arranged such that the radiation spots thereof have a diameter of about 1 cm. The measuring pitch is not the measuring pitch ($l_0$) of 1.5 m used in the conventional evaluation method, but is obtained by dividing the measuring pitch ($l_0$) into small intervals, e.g., 1/15 intervals (10 cm intervals) so as to obtain a plurality of data.

If necessary, calculated or averaged sums of the evaluation data at a number of points corresponding to the small intervals are input as evaluation data ($A_i B_i C_i$) In this way, unnecessary data caused by gravel or other objects on the road surface can be omitted, thereby providing an improvement in evaluation accuracy.

The analysis method of the longitudinal section profile using the data obtained by evaluation by the vehicle 1 described above will be described below with reference to FIGS. 6a and 6b.

(STEP 1)

$\phi_i$ and $l_i$ are obtained from the road surface three-dimensional pattern $d_i$ in accordance with equations:

$$\phi_i = \tan^{-1}(d_i/l_0) \quad (4)$$

$$l_i = (l_0 + d_i) \quad (5)$$

A line $a_1$–$b_1$ connecting the evaluation start point $a_i$ and the first measuring point $b_i$ is set as temporary coordinates in accordance with $\phi_i$ and $l_i$. Next, a temporary level $Y_i$ at each measuring point from the temporary coordinates $a_1$–$b_1$ and a temporary horizontal distance $X_i$ from the evaluation start point $a_i$ at each measuring point on the temporary coordinates $a_1$–$b_1$, having the ground point $a_1$ as the evaluation start point $a_i$ as the origin, are calculated by the equations given below.

The road surface level $y_i$ and the temporary horizontal distance $x_i$ between each measuring point and the next measuring point can be calculated by:

$$y_i = l_i \cdot \sin(\phi_{i-1} + 2 \cdot \phi_i) \quad (6)$$

$$x_i = l_i \cdot \cos(\phi_{i-1} + 2 \cdot \phi_i) \quad (7)$$

The temporary road surface level $Y_i$ and the temporary horizontal distance $X_i$ at each measuring point are calculated by:

$$Y_i = Y_{i-1} + y_i \quad (8)$$

$$X_i = X_{i-1} + x_i \quad (9)$$

Note that the temporary road surface levels at ground points $a_1$ and $b_1$, the temporary horizontal distance at the ground point $a_1$, and the initial value $\theta_0$ are naturally 0.

(STEP 2)

Figure 6A:
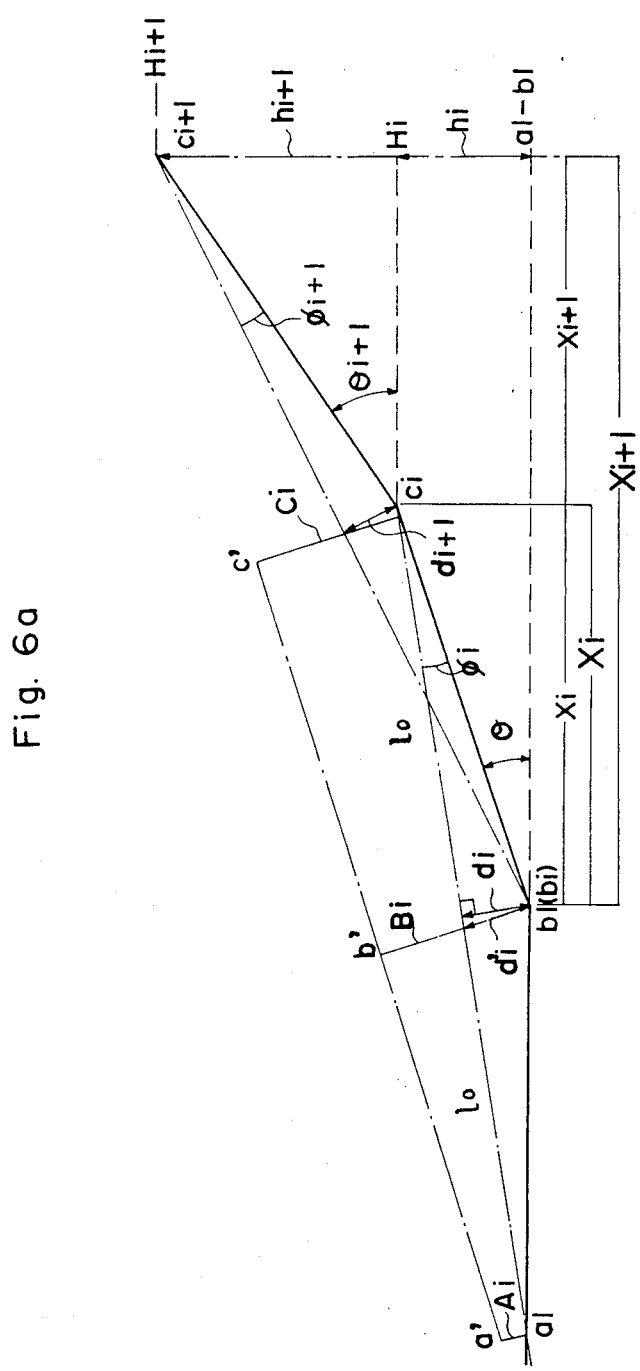

As shown in FIG. 6a, when the three-dimensional pattern at each measuring point (e.g., ground point b at each point $B_i$) based on the data ($A_i B_i C_i$), obtained by simultaneous evaluation, is calculated in accordance with equation (3) below, substantially the same result as obtained with a 3 m profile meter can be obtained:

$$d'_i = B_i - (A_i + C_i)/2 \quad (3)$$

In this case, if the road surface b at each point $B_i$ is recessed, we get $d'_i > 0$, and if the road surface b projects, we get $d'_i < 0$.

Since the level meters 7a, 7b, and 7c are mounted at the points a' and c' on the vehicle base 10 and near the axle, a line a'–c' connecting the level meters 7a, 7b, and 7c and a line connecting the ground points $a_i$ and $b_i$ can be assumed to be parallel to each other. The value of $d'_i$ calculated in accordance with equation (3) is a value considering the vibration of the base 10 of the evaluation vehicle 1, and an evaluation error arising from the deviation in the measuring pitch of 1.5 m. Therefore, this value does not represent an actual longitudinal three-dimensional pattern $d_i$ along a line which perpendicularly suspends toward the road surface point $b_i$ from the midpoint on the line connecting the road surface points $a_i$ and $c_i$. The influence of the vibration angle of the vehicle (generally 2° to 3° in the vehicle 1 and the like with respect to an axis parallel to the road surface) on each measurement data $A_i B_i C_i$ is accounted for only by its sine component in the case where the measurement is made in a direction perpendicular to the road surface. Such a vibrational influence is negligible within an angle of 2° to 3°, as is the deviation in the measuring pitch due to vibration. Therefore, with control by the accurate travel speedometer/range finder 8, the error within the diameter of the radiation spots of the level meters 7a, 7b, and 7c can be suppressed.

For this reason, the calculated value $d'_i$ and the actual longitudinal three-dimensional pattern $d_i$ can be considered to be equivalent.

(STEP 3)

Since the temporary road surface level $Y_i$ and the temporary horizontal distance $X_i$ at each measuring point obtained by the above equations are temporary coordinates having the reference line $a_i$-$b_i$ as a coordinate axis, they can be converted into coordinates in a standard coordinate system H-O-D.

In this manner, a road surface height $H_i$ and a horizontal distance D at each measuring point from the measurement start point a can be calculated by the equations given below, by using the altitudes (Hb, Hc) or relative height (Hb−Hc) at two given points known from a measuring drawing or the like, and between the measurement start point a or midpoint b and the final measuring point c, e.g., the midpoint b and the final measuring point c.

Figure 6B:
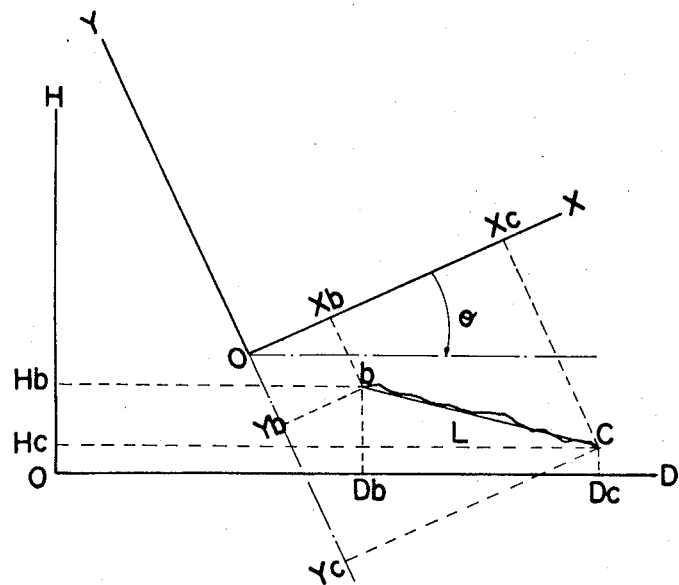
Figure 9:
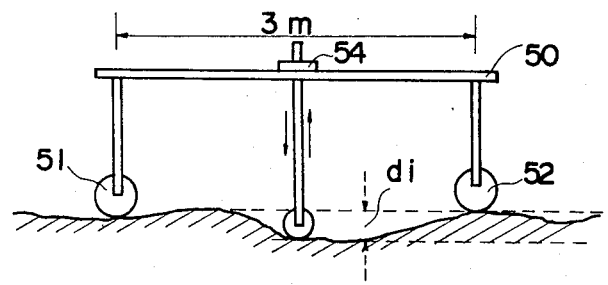

When the temporary coordinate system Y-O-X is rotated through an angle $\theta$, as shown in FIG. 6b, the standard coordinate system H-O-D can be obtained.

In order to obtain $\theta$, cos $\theta$ and sin $\theta$ can be obtained by:

$$Db - Da = (Xb - Xa)\cos\theta + (Yb - Ya)\sin\theta \quad (10)$$

$$Ha - Hb = (Xb - Xa)\cos\theta + (Yb - Ya)\sin\theta \quad (11)$$

Substitution of sin and cos obtained by the above equations in the equations below yields the road surface height $H_i$ and the horizontal distance $D_i$ at each measuring point:

$$D_i = X_i \cos\theta + Y_i \sin\theta \quad (12)$$

$$H_i = Y_i \cos\theta - X_i \sin\theta \quad (13)$$

This analysis processing is automatically performed within the control computer 14, and the analysis data is recorded in the magnetic recording unit 15.

(C) Construction, Evaluation, and Processing of Crack-Evaluating Means

Figure 7:
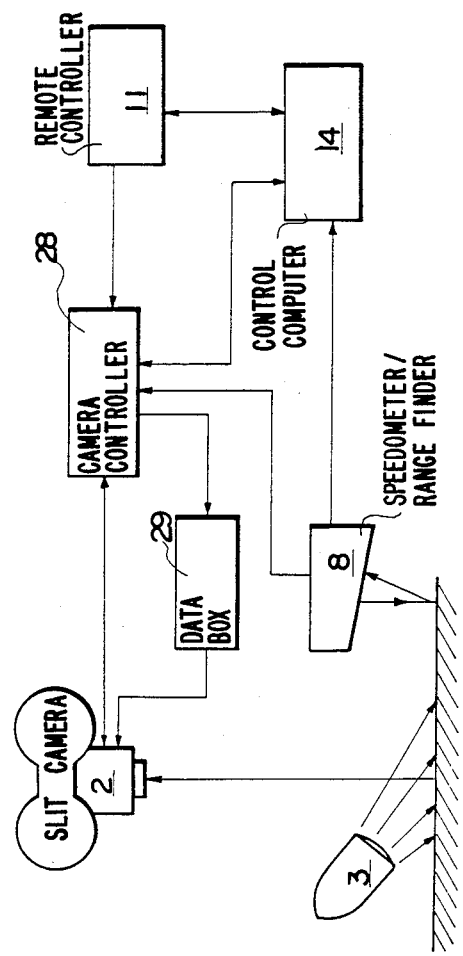
FIG. 7 is a flow chart of an evaluation/processing process for cracks.

Referring to FIG. 7, the halogen lamp array 3 is a lateral lamp array mounted at the front end of the evaluation vehicle 1. The array 3 radiates the road surface A at a predetermined inclination angle with reference to the road surface A, and has a maximum radiation light intensity of about 8,000 lux. Reference numeral 28 denotes a control section of the slit camera 2; and 29, a data box.

The slit camera 2 is mounted at the distal end of a member 19 fixed at the front portion of the top of the evaluation vehicle 1. The member can be extended in the travel direction of the vehicle. The optical axis of the camera 2 perpendicularly intersects the road surface A. Based on the signal from the speedometer/range finder 8, the slit camera 2 can continuously sense road surface information at a film feed speed corresponding to the vehicle speed. The slit camera 2 forms an image of cracks and other damage to the road surface irradiated with the halogen lamp array 3 on a 35 mm film, at a reduced scale of 1/200.

After the developed 35 mm film is analyzed using a film analysis unit 31 in an analysis station 30, the road surface damage state is detected by a known means. Thereafter, the cracks, ruts, and other properties are calculated by a general purpose computer 32 in the form of an area ratio. The area ratio is recorded by a magnetic recording unit 33 and is output to the X-Y plotter 35, a line printer, or the like as needed.

(D) Overall Analysis

Figure 8:
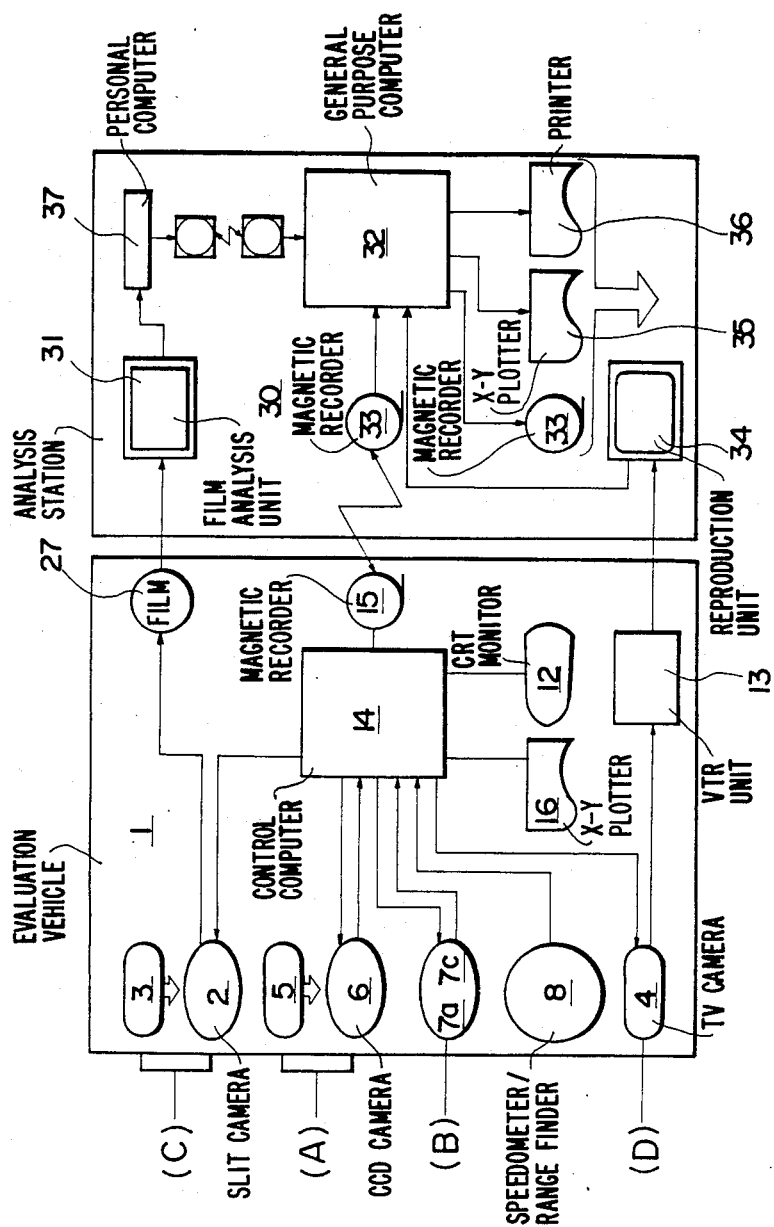
FIG. 8 is a flow chart showing a summary of the above process and an explanation of the relationship between the evaluation system and the analysis station.

FIG. 8 shows the evaluation and processing in the evaluation vehicle 1 and the analysis station 30. As described above, the evaluation data of the road surface cross-section profile (A) and the longitudinal section profile (B) are processed by the control computer 14 based on the signal from the speedometer/range finder 8, and recorded in the magnetic recording unit 15. Meanwhile, the road shoulder information (D), obtained by the TV camera, is recorded in the VTR unit 13 and the image of cracks (C) and so on are continuously image-formed on a film 27, based on the signal from the speedometer/range finder 8. The film 27 is analyzed by the film analysis unit 31 in the station 30, and the obtained data is stored in the general purpose computer 32 through a personal computer 37.

The shoulder information recorded in the VTR unit 13 is also recorded in the general purpose computer 32 through a reproduction unit 34.

The data and information acquired and recorded by the evaluation vehicle 1 are classified into a master file for each interval and subjected to evaluation and analysis on each item by the general purpose computer 32. If required, the data and information can be output through the X-Y plotter 35 or printer 36.

As described above, according to the present invention, various properties of road surfaces such as the road surface cross-section profile, the longitudinal section profile, and cracks can be automatically and accurately evaluated upon one-time travel of the vehicle. Particularly when there is a relative speed between the evaluation system (evaluation vehicle) and the object system (road surface), evaluation can be performed irrespective of such a relative speed. Therefore, evaluation can be performed without great limitations to the application range, even on highways.

What is claimed is:

1. A vehicle for evaluating the properties of road surfaces, having a single speedometer/range finder, comprising:
   (a) road surface cross-section profile evaluating means, having a CCD camera which is arranged at a rear or front portion of the evaluation vehicle and sensing a beam reflected from the road surface irradiated with a fan laser beam, said CCD camera sensing the reflected beam over a predetermined period of time based on a signal from the speedometer/range finder so as to form a matrix charge distribution on a light-receiving surface thereof by integration exposure corresponding to the sensing time, the matrix charge distribution being scanned in the road surface longitudinal section direction so as to obtain a peak exposure for each scanning line, and the road surface cross-section profile being formed in accordance with the peak value;

(b) road longitudinal section profile evaluating means, having three optical level meters which are mounted at equal intervals on a vehicle base parallel to the road surface so as to be in series in the travel direction of the vehicle and to correspond to a measuring pitch (l0) interval, a road surface radiation spot diameter of said optical level meters being set to be about 1 cm, distances to the road surfaces at three points corresponding to the measuring pitch (l0) being simultaneously measured for each measuring pitch (l0) based on a signal from the speedmeter/range finder, a temporary road surface level (Yi) and a temporary horizontal distance (Xi) at each measuring point having an evaluation start point (ai) and a first measuring point (bi) as temporary coordinates being obtained based on the evaluation data at the three points, and the temporary coordinates being converted into standard coordinates from the temporary road surface level (Yi) and the temporary horizontal distance (Xi) and the altitudes at two given points among the measuring points, thereby obtaining a road surface height (Hi) and a horizontal distance (Di) at each measuring point; and (c) crack-evaluating means having a film camera which is arranged at a front or rear portion of the evaluation vehicle such that said film camera can sense in a direction perpendicular to the road surface, and a projector for projecting light in a direction at a predetermined angle with respect to an optical axis of said film camera, said film camera being capable of sensing the road surface at a film feed speed corresponding to a vehicle speed based on a signal from the speedometer/range finder.

2. A vehicle according to claim 1, wherein, in said longitudinal section profile evaluating means, said three optical level meters can evaluate a plurality of measuring points obtained by dividing the measuring pitch (l0) based on a signal from the speedometer/range finder, an average value of the data obtained at the plurality of measuring points being obtained as evaluation data at the three points corresponding to the measuring pitch (l0).

3. A vehicle according to claim 1, wherein, in said road surface cross-section profile evaluating means, an optical filter of the same color as the laser beam is mounted on said light-receiving surface of said CCD camera.

* * * * *